July 25, 1933.    M. L. CORNELL    1,919,685
DOOR CONSTRUCTION
Filed March 23, 1932    3 Sheets-Sheet 1

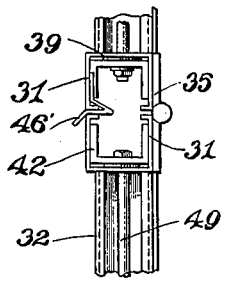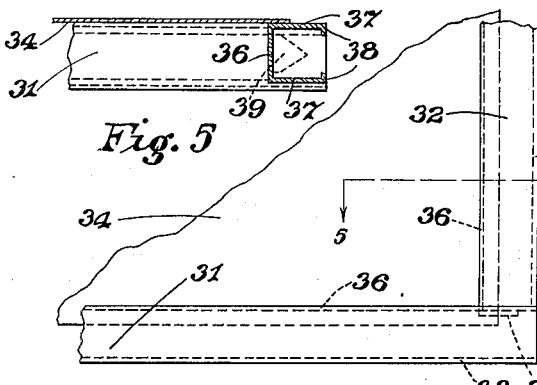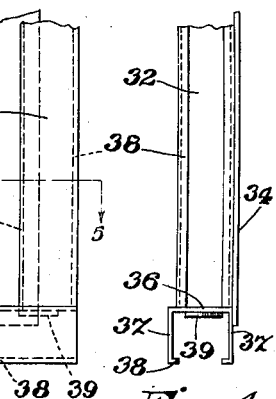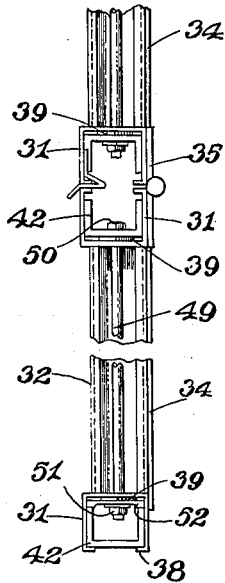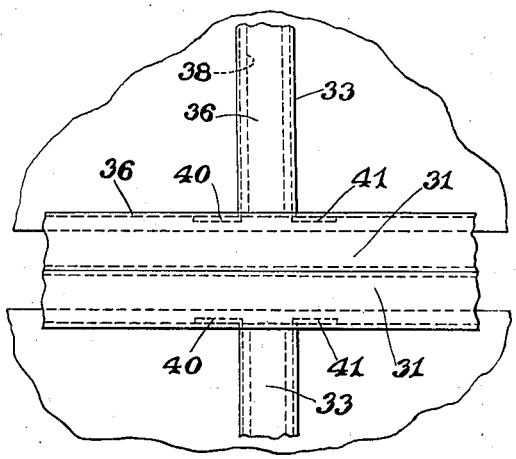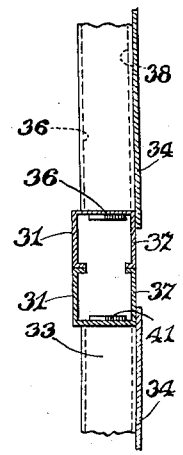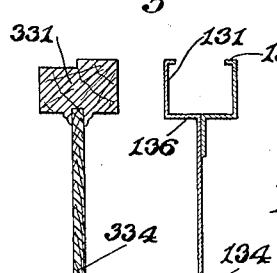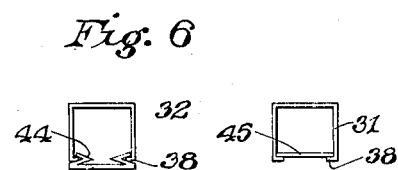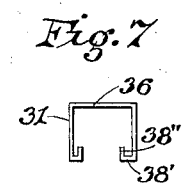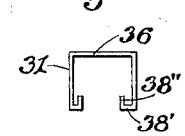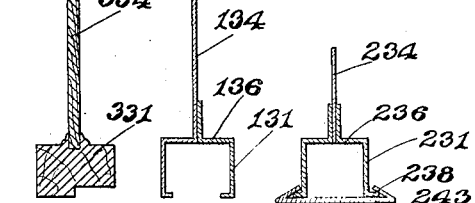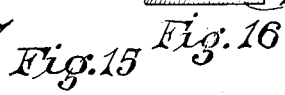

July 25, 1933.   M. L. CORNELL   1,919,685
DOOR CONSTRUCTION
Filed March 23, 1932   3 Sheets-Sheet 3
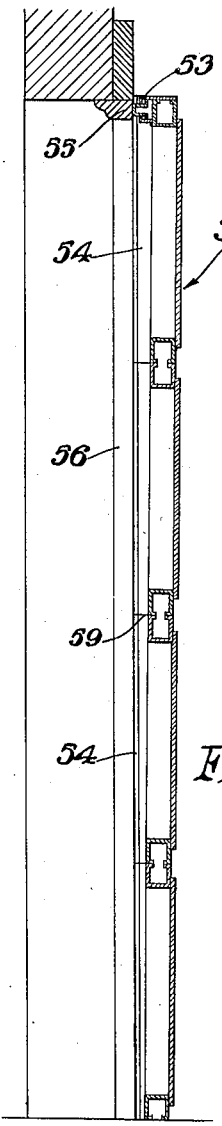
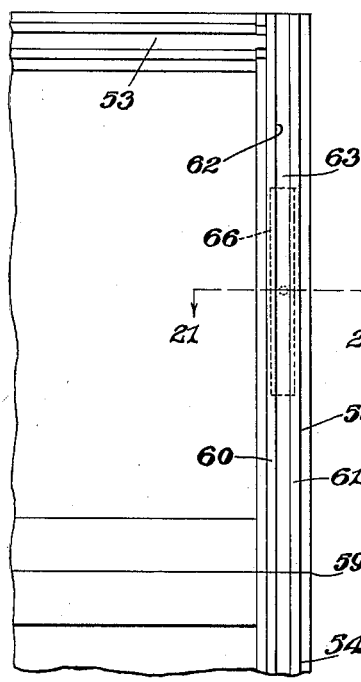
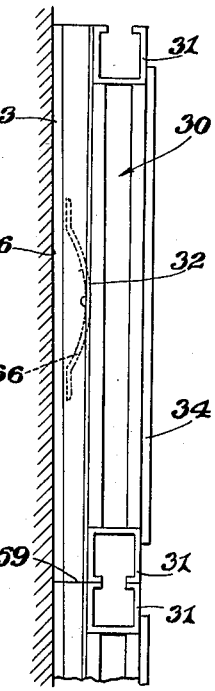
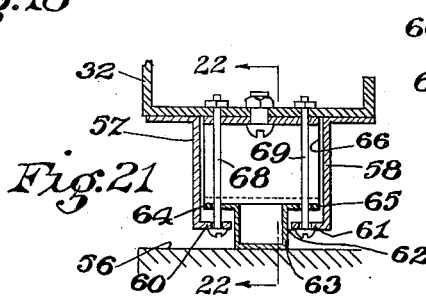
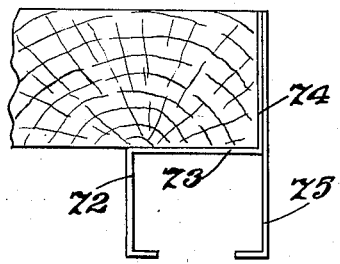
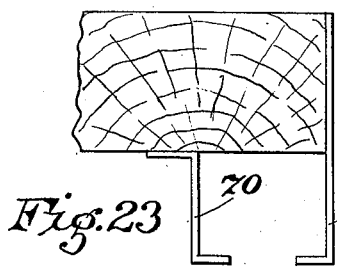
INVENTOR
Milton L. Cornell
BY Watson, Bristol, Johnson & Leavenworth
ATTORNEYS Patented July 25, 1933

1,919,685

UNITED STATES PATENT OFFICE

MILTON L. CORNELL, OF NEW YORK, N. Y., ASSIGNOR TO CORNELL IRON WORKS, INC., OF LONG ISLAND CITY, NEW YORK, A CORPORATION OF NEW YORK

DOOR CONSTRUCTION

Application filed March 23, 1932. Serial No. 600,618.

This invention relates to doors of the type which are adapted to be slidably opened to a substantially horizontal overhead position. Such doors are usually formed of a number of flexibly articulated panels, and are useful as closures for garages, service stations, warehouses, piers, factories and other buildings.

A general object of the invention is to provide improved structural features which enhance and increase the serviceability and expedite the manufacture of doors of this type.

Further objects of the invention are the provision of such overhead acting doors having an improved commercially practicable metal construction, marked by lightness coupled with strength, and possessing additional improved and advantageous characteristics as to ease and economy of manufacture and assembly, freedom from deterioration from such causes as cracking, warping, rotting, rusting, shrinking, sagging, and the like, and which are substantially fireproof and weatherproof.

More specifically, the present invention contemplates provision of metal doors having the above and other advantages over generally similar forms of wooden doors and possessing advantages as to strength and lightness or ease and economy of manufacture over previously known metallic doors, and which retain or simulate the attractive paneled appearance incident to wooden door construction.

Another particular object of the invention is to provide such a door with improved weather-proofing means.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 3 is a fragmentary front elevation showing structural details at the lower corner of the door shown in Fig. 2, with hardware removed;

Fig. 4 is a side elevation of the construction shown in Fig. 3, viewed from the right in that figure;

Fig. 5 is a horizontal sectional view taken along line 5—5 of Fig. 3;

Fig. 6 is a fragmentary front elevation showing the details of construction at the joints between any of the muntins and intermediate rails of the door shown in Fig. 1;

Fig. 7 is a fragmentary side elevation of the construction shown in Fig. 6;

Fig. 8 is an end view of a rail having the improved form contemplated in the present invention, and showing a reinforcing channel placed therein;

Fig. 9 is an end view of a rail or stile showing one form of closure means therefor;

Fig. 10 is an end view similar to Fig. 9, but showing a reinforcing or closure plate;

Fig. 11 is an end view of a modified form of rail, stile, or muntin;

Fig. 12 is an end view showing the lower rail of one frame juxtaposed over the upper rail of an adjacent panel frame, and equipped with a weather-proofing strip;

Fig. 13 is an end view of a rail showing a modified form of weather-proofing strip;

Fig. 14 is a fragmentary side elevation substantially corresponding to line 14—14 of Fig. 1, showing a completely assembled door construction;

Fig. 15 is a vertical sectional view showing a modified form of metal panel frame construction;

Fig. 16 is a vertical sectional view showing another modified form of metal panel frame construction, and a closure therefor;

Fig. 17 is a vertical sectional view of a wooden panel frame embodying a feature of the present invention;

Fig. 18 is a vertical sectional view through a door embodying features of the present invention, and more particularly illustrating an improved form of weather-stripping which is applied thereto;

Fig. 19 is a fragmentary front elevation of the upper right-hand corner of a door equipped as in Fig. 18;

Fig. 20 is a side elevation of the construction shown in Fig. 19, the weather-stripping being shown juxtaposed against a cooperating door jamb;

Fig. 21 is a sectional view through the weather-stripping taken along line 21—21 of Fig. 19;

Fig. 22 is a fragmentary sectional view through the weather-stripping, substantially corresponding to line 22—22 of Fig. 21; and Figs. 23 and 24 are end views of modified forms of weather-stripping channels.

Doors of the general type contemplated in the present invention have heretofore most frequently been constructed with wooden rails, stiles, muntins and panels, and with window frames of the same material. These wooden doors, being exposed to the elements, are subject to drawbacks such as rotting, warping, shrinking and cracking, accentuated by the unusual stresses incident to their manner of use which entails vertical stresses during certain periods and horizontal stresses at others. Such material also is subject to destruction by fire, which is a particularly serious drawback in the case of garage doors. For these reasons, it is desirable that a satisfactory and commercially practicable form of metal door be provided. Up until the time of the present invention, however, the known constructions for metal doors of this type have been necessarily very much heavier than similar wooden constructions, with consequent difficulties as to operation and total cost of construction which have served in many cases to prohibit them from commercial use. Doors made in accordance with the present invention obviate these characteristic faults of previous wooden and metal doors, and do this without sacrificing the attractive paneled effect usual to wooden doors.

The improvements contemplated relate more particularly to the door per se, and the described door construction is adapted to be used with any suitable known types of counterweights, springs, and other operating gear.

Figure 1:
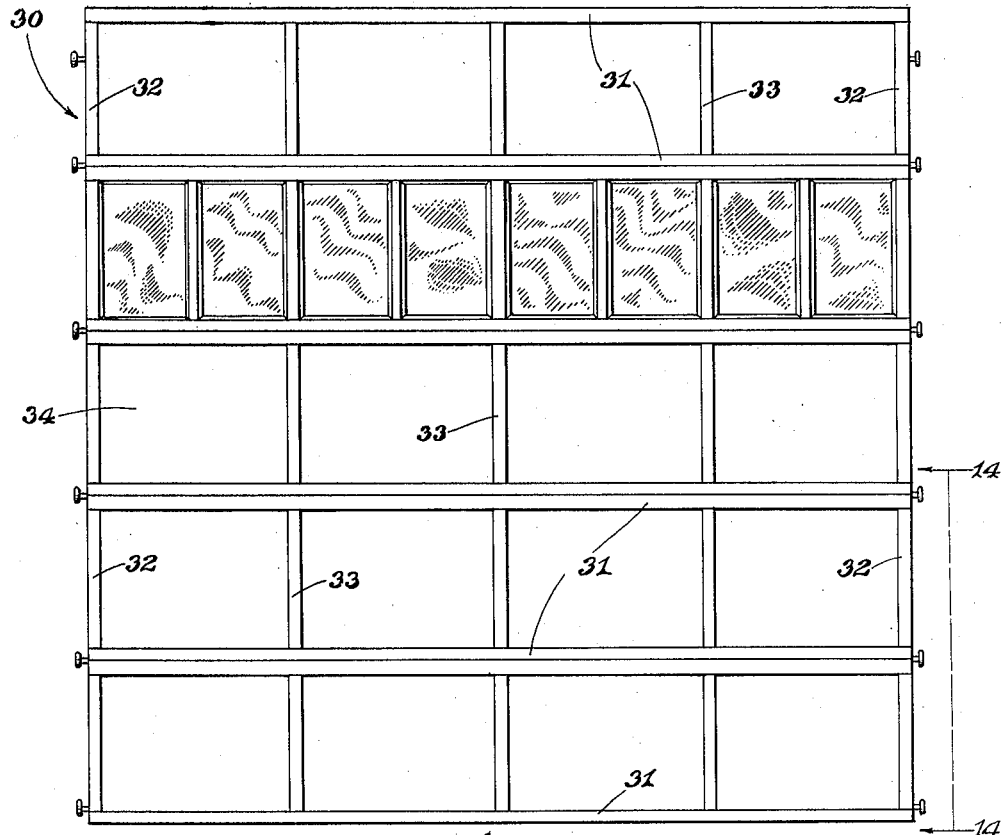
Fig. 1 is a front elevation of a door embodying features of the invention, viewed from the outside of the building.
Figure 2:
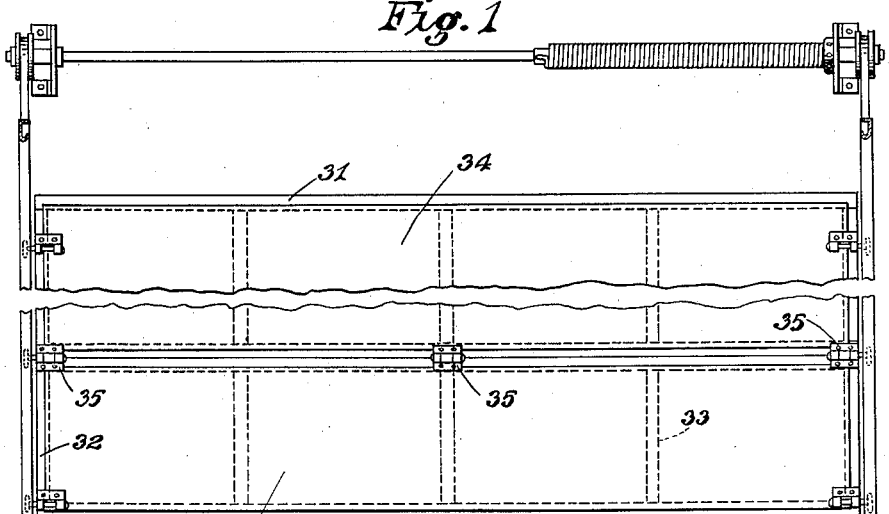
Fig. 2 is a rear elevation of a door such as that shown in Fig. 1, certain parts being broken away to illustrate more compactly the construction, with the tracks and other operating structure being generally indicated.

Referring more particularly to the drawings, and especially to Fig. 1, there is shown a door generally designated 30, comprising rails 31, stiles 32 and muntins 33, having fastened thereto sheet paneling 34. This door is compositely formed of a plurality of rectangular panel frames which are mutually hinged as at 35 (Fig. 2) and which are equipped with rollers for operation in any suitable form of trackway. These rails, stiles and muntins are formed of sheet metal, preferably sheet steel, and in their preferred form have the configuration which is well illustrated in Figs. 4, 5 and 8. In such preferred configuration each of these elements is in the form of an open backed tube or U-shaped channel with overhanging flanges, having a web 36, side walls 37, and inwardly bent overhanging strengthening or rigidifying flanges 38. Said tubes may also have one or both of the flanges out-turned, or may have a flange only on one side of the channel and still attain some of the benefits of this invention.

This construction needs no increase in weight to approach the strength of an entirely closed tubular section and avoids the difficulties and inconvenience attendant upon fabrication and assembly of a door panel frame in which such closed tubular members are used, as will more clearly hereinafter appear. Further, the present open backed tube construction possesses considerably greater resistance to the stresses of use than does an unflanged U-shaped channel section made from metal of the same gauge. That is, to form a door of commensurate strength from unflanged channel sections, considerably heavier thicknesses of metal would have to be employed, and the ultimate weight of a door so formed would be too great. By the present invention, sheet steel of relatively light gauge may be used in the formation of the rails, stiles and muntins of the present door, which door will possess marked strength coupled with comparative lightness.

Referring now to the corner construction shown in Figs. 3 to 5, it will be seen that the rail 31 of the panel frame has its open back outwardly disposed with relation to the panel, and that the upright stile 32 has its open back outwardly disposed along the edge of the door and has each end abutting and seating on the web 36 of a rail. While this location of the open back is preferred, the open back may be one of the other faces of the four-sided tube shown and the term "open backed tube" as used herein is intended to refer to any channel with one side open except so far as it is closed by projecting flanges. The web of this stile 32 has a projecting tenon 39 which is passed downwardly through a slot in the web of rail 31. This tenon is turned over as illustrated in Fig. 3, the application of a hammer or other tool for this purpose being greatly facilitated by virtue of the U-shaped construction of the rail. All of the joints between the stiles and rails throughout the entire door preferably are made in this manner. As is shown in Figs. 6 and 7, a somewhat similar joint is formed between the muntins 33 and their respective rails 31, such muntins being provided with a pair of tenons 40 and 41 which pass through slots in the web 36 of the rail and which are turned over to form a firm rigid joint. The webs 36 of these muntins preferably are faced forwardly, and their overhanging reinforcing flanges 38 are faced rearwardly and are located in a plane flush with a rearward side wall 37 of their respective rails. In the form illustrated in Figs. 3 and 4, the interconnected rails, stiles and muntins of a given panel frame have fastened across the back thereof a sheet metal panel 34, which can be bolted, riveted or spot-welded in place against these elements. The use of open backed tube sections renders the attachment of these panels to the rails and stiles, by any of these methods, quite convenient and economical. When desired, the panel material, such as 34, may conveniently be attached to stiles, rails, muntins and so on in some plane intermediate the thickness of the door, in a location similar to that illustrated in connection with the somewhat different embodiment shown in Fig. 15.

The union of rails to stiles, muntins, panels and other parts is further assisted by reinforcing means, such as the short channel 42 (Figs. 8 and 14) preferably constructed of heavier metal and inserted in the rail 31 at the point where the union is to be effected. Bolts, screws, tie-rods and like connecting means which would tear out of the unreinforced light metal, may be used, as herein shown, in combination with said reinforcing channels 42 to unite the parts at localized portions thereof, such as corners and centrally located hinged joints. The difficulty of fastening hinges and other hardware to light closed tubes has heretofore been a source of considerable expense and difficulty. This difficulty is removed by the present open back tube construction, which may conveniently have these short reinforcing channels inserted therein and fastened by means of bolts, rivets, or spot welds. The reinforcing elements 42, in conjunction with tie-rods and the like, have a measure of utility, however, even when used with closed tubes of sheet metal or with other hollow light metal framing members.

When desired, suitable closure means may be provided for the open portions of the stiles and/or rails, both to improve the appearance and to add to the strength of the door. A desirable form of closure 43 is shown in Fig. 9, in the form of a sheet metal strip having its margins folded as illustrated to provide grooves 44 which are adapted to fit over flanges 38. This strip 43 may either be slid from the end or sprung into place, during or after fabrication of the door. In Fig. 10, there is illustrated a batten plate 45, which may be inserted in the channels 31, 32 and 33 at points where the heaviest bending stress occurs. Because of the overhanging flange construction of these channels at 38, these batten plates can be easily inserted and riveted, welded or otherwise fastened in place inside of the channel, thus preserving the outside dimension of the latter. These batten plates usually are in short lengths and are applied at local portions of the rails for reinforcing purposes, but, if desired, this construction also is subject to use as a closure means, having the functions of closure strip 43. By the present construction closure may be deferred until after the door has been otherwise fabricated and paint or other coating for protection against moisture applied to the inner surfaces of the open backed tubes and the parts contained therein. This is not possible with completely closed tubes.

A modified form of open backed tube section generally useful as a rail, stile or muntin, is shown in Fig. 11, this form being generally similar to that shown in Figs. 4 and 8, but having inwardly overhanging flanges 38' which respectively are further provided with additional invaginated reinforcing flanges 38''. This form of open backed tubing possesses additional strength and stiffness, and offers, to a satisfactory extent, the convenience in making connections and attachments which is characteristic of the first described form of open backed tube.

Preferably the door is provided on its outer side with weather strips running the full width thereof, where the adjacent upper and lower rails of two juxtaposed panel frames come together. Such a strip is shown in Fig. 12, and comprises an elongated downwardly bent portion 46 having a rearwardly located upward fold 47 which is adapted to be slid or snapped into place over a flange 38 on the under side of the upper meeting rail 31. A slightly modified form of strip is shown in Fig. 13, comprising, in addition to a portion 46' and a fold 47' like those of the previous form, an upward extension 48 which is adapted to be snugly coped around, fitted behind, or otherwise suitably located and fastened in place by means of the reinforcing channels 42 which occur at intervals along the rails. These strips 46 or 46' act to shed water outwardly of the door so that it cannot run down the face of the door or seep or beat into the joints between rails, and also serve to close these joints more tightly against weather and light.

The side edges of the two lowermost panels of a door, completely assembled in accordance with a preferred construction, are illustrated in Fig. 14. Here the respective panel frames are shown as having upper and lower rails 31 spaced by stiles 32 which are connected thereto by means of tenons 39, and faced on their inner side with panel sheets 34, all as previously described. Short lengths of reinforcing channels 42 are located within the rails at this side edge, and bear against and help to hold in place the tenons 39. Suitable hinges shown diagrammatically at 35 connect the lower rail of one superposed panel frame to the upper rail of the adjacent nether panel frame, and are bolted, riveted, or otherwise suitably fastened to reinforcing channels 42. The upper and lower rails of each panel frame are further connected, through the reinforcing channels 42, by tie-rods or bolts 49, which pass through fitted openings in the rail webs and in the channels 42. This tie-rod has a head 50 and a nut 51, which may easily be reached by tightening tools, by virtue of the illustrated open back tube construction of the rails. It is intended that one of these tie-rods should be used at each side of every panel frame or section, and also, when desired, wherever hinges occur. By virtue of this construction, vertical tensioning forces to which the door is subjected, especially during lowering or raising, are transmitted from any given panel frame directly through the tie-rods, reinforcing channels, and hinges, to the panel frames above and below. These forces are thus cared for by a strong, connected line of steel parts, running from the top to the bottom of the door along both its sides, and in the case of wide doors, along its center, where additional hinges are aligned vertically. Since tensioning forces are thus cared for, the stiles and muntins, and their joints with the rails, are totally, or at least to a large extent, relieved from tension, being subjected only to compressive forces.

In the case of the lowermost rail 31 of the bottom panel frame, the reinforcing channel may be extended entirely across the rail opening, with its web engaging against flanges 38 as illustrated in Fig. 14. In this event, short reinforcing plates 52 may be used to cooperate with the tie-rods 49. These plates 52 also serve to shim up channels 42 and to clamp against tenons 39. When the door is in closed vertical position, the bottom rail takes its entire residual weight, except as counterbalanced by the usual springs or counterweights, usually transmitting such weight through corner attachments (not shown) fastened near the opposite ends of the rail, and the described reinforced construction is therefore desirable. In addition, this lowermost rail preferably is made of rustless steel, bronze, aluminum, or some other relatively non-corrodible material, since this bottom part of any exterior door is subjected to the greatest danger of severe corrosion, as pointed out in my Patent No. 1,530,653, issued March 24, 1925.

The panel frame containing panes of glass, as shown in Fig. 1, follows generally the construction described in detail. The muntins for the glass may be fastened to their rails by means of the tenon joints, bolts and reinforcing channels described above, and all fastenings of rabbets and like parts are rendered particularly convenient and economical by the use of the open back tubular section.

In all of the rail constructions thus far described, the dimension of web 36 is preferably greater than that of side wall 37. That is, the greater sectional dimension of the rail is always from front to back of the door. This feature serves to prevent sagging of the door while it is in its horizontal overhead position. It frequently occurs that overhead acting doors are permitted to lie horizontally overhead in their tracks, during a considerable part of the day, especially in warm weather. Previous designs of paneled wooden overhead acting doors have always presented the rails and stiles with their greatest sectional dimension extending along the plane of the door, after the fashion of ordinary swinging doors which are hinged at their sides. When previous forms of conventional wooden doors were thus horizontally supported only at their end for considerable lengths of time, the bending stress at their centers was such that a permanent deflection or sag was usually eventually unavoidable, especially in the case of the wider types of doors. In the present improved overhead acting door construction, wherein the rails present their greatest dimension along a plane normal to the plane of the door, the door without added weight is designed inherently to possess the requisite strength to circumvent central sagging of the panel sections, thus doing away with the expensive and inefficient extraneous supports and braces that heretofore have characterized attempts to solve the problem of sagging. This advantage can be obtained especially in wooden doors of otherwise conventional construction, but has utility in metal doors also. In Fig. 17 a section through a wooden panel frame is shown, the frame including a wooden panel 334 to which are attached rails 331, which present their greater sectional dimension vertically when the door is in overhead position, in order effectively to resist sagging without increasing the over-all size or weight of the rails.

In Fig. 15 there is shown a modified form of panel construction in which a sheet steel panel 134 has formed integrally with its upper and lower edges, one-half of rail sections 131. The other half of these rails are separately made somewhat in the form of a T-bar, as illustrated, and are bolted, riveted, or spot-welded in place. This construction is particularly amenable to mass production in standard sizes. These compositely formed rails have at 138 the characteristic overhanging flange construction illustrated at 38 in the previously described embodiments. Also, they present composite web sections 136 which preferably are of greater width than the side walls of these rails, these webs being preferably sufficiently wide effectively to prevent sagging when the door is suspended overhead. The modification shown in Fig. 16 comprises a central sheet steel panel 234, provided at its upper and lower edges with separate rail sections 231. This form is shown as having out-turned overhanging flanges 238. At times also, some of the benefits of the invention may conveniently be secured through use of a rail having one inturned and one out-turned flange. Here, as in Fig. 15, the composite web 236 is preferably made sufficiently wide to overcome any tendency of the panel frame to sag.

In Figs. 19 to 24 there are shown further improved structural features of the present door, whereby it is able to form a weather-tight joint with the door frame which it closes. With commonly used previous wooden doors, because of the relative inexactness of the fabricated woodwork, the general looseness and play in the structure of this type of door and the tendency of all exposed woodwork to shrinkage, warping, or swelling, it was practically impossible to make a tight joint of all of the panels against the door jambs. Observation has shown that even when the door was pressed or wedged forward, and when straight weather-strips on the jamb were brought against the door from top to bottom, some panels, or points on some panels, would stand away from the door frame, thus spoiling the weather-proofing effect.

With the presently disclosed construction, each side of each panel, and the top rail of the top panel, are provided with independent, yieldable, weather-stripping units, each of which is self-adjustable to form a snug fit against its adjacent part of the door frame.

The general arrangement of this stripping is indicated in Fig. 18, where there is shown a door 30, provided along its top rail at 53, and independently along each side of each panel at 54, with a series of yieldable, self-adjustable, sheet metal weather-strip units. Unit 53 is adapted to abut against a lintel 55, while the units 54, which break from each other at the joints where the panel frames are hinged, separately engage against a door jamb 56 at either side of the doorway. Each unit combines a yieldable closure strip 63 with a fixed box-like casing into which it moves and which cooperates with it to close the opening between door and jamb. In one desirable construction of units 54, they comprise a pair of spaced sheet metal Z-bars 57 and 58 (best shown in Fig. 21), which are vertically fastened along each stile 32 and which terminate evenly with the upper and lower edges of their respective panel frames at joints such as 59. These Z-bars, or guides, have mutually approaching flanges 60 and 61 which define between them a space 62, through which operates a closure strip or member 63. Such member is in the form of a sheet metal channel having out-turned flanges 64 and 65, which engage behind flanges 60 and 61 and serve to limit outward movement of closures 63. The channel portion of these closure members 63 projects outwardly through opening 62, and is adapted to contact the door jamb 56 (Figs. 20 and 21). A yieldable means, such as leaf spring 66, is inserted behind closure member 63, in order normally to urge it outwardly away from the door. This spring is screwed or bolted to the door stile as at 67. A pair of screws or bolts 68 and 69 extend respectively between the flanges 60 and 61, and the door stile, and are slidably threaded through openings in closure flanges 64 and 65. Although, for convenience of illustration, screws 68 and 69 are shown centrally located opposite screw 67, it will be understood that these screws may be passed through the units 54 at any suitable point therealong. It will frequently be desirable to locate these screws above or below the spring 66, to avoid piercing or drilling the latter. Such construction prevents the closure member from shifting up or down as it rubs against the door jamb during closure or opening of the door. The several weather-stripping units 54 are of substantially identical construction, and the structure of unit 53 also follows the described construction, except that this strip is usually longer than any of the units 54, and may preferably have a plurality of spring pressure means, such as 66. When the door, thus equipped, is lowered into its closing position, the tracks and rollers at the sides of the door carry it into proximity to the faces of the jambs and lintel, and the closure members 63 of the several weather-strip units are pressed back against the yieldable pressure of their springs 66. The various independent strip sections individually snugly accommodate themselves to the condition obtaining in their local area, and thus serve collectively to form a weather-tight closure around the entire door.

In Figs. 23 and 24, modified forms of enclosure guides are shown, these constructions being desirable when it is wished to lap the door on the jambs as little as possible. In Fig. 23, such construction involves a Z-bar 70, which is substantially identical to previously described Z-bar 57, which cooperates with an angle bar 71. This angle bar is fastened to the edge of the door, which in this case is illustrated (though not necessarily) as being wooden, and projects forwardly flush with such door edge. The modified structure illustrated in Fig. 24 involves an angular bent sheet metal guide 72 having a web portion 73 overlying the face of the door and having a rearwardly extending attaching flange 74 which is adapted to be fastened to the side edge thereof. A cooperating angular guide strip 75 is provided, this strip being substantially similar to and being attached in the same manner as strip 71 described in the preceding form. With both of these last described constructions, the position of the weather stripping section per se is somewhat closer to the side edge of the door, whereby the doorway need not be lapped behind the door jamb to as great an extent. Instead of being faced forwardly, these units may be mounted on the side edges of the door and faced laterally when desired. In this case, the location of the cooperating jamb would be correspondingly altered.

Preferably, the aligned units 54 along the sides of the door are constructed mutually to form a wedge shaped strip which tapers uniformly from its widest top part to its most narrow bottom part, as is most clearly indicated in Fig. 18. In this case a slightly sloping track (not shown) for the door is used, and the door in its closed position is brought to rest on the sill in the slightly inclined position shown in Fig. 18, with the contacting portions 63 of tapered sections 54 substantially parallel with the vertical door jambs. This construction is helpful in obtaining and maintaining a satisfactory snug fit between the weather-stripping and the door jamb, and facilitates opening of the door, since the latter tends quickly to disengage from the door frame as it is elevated. However, it is to be understood that the presently described weather stripping sections 54 could be made straight, if desired, for use on a door mounted in truly vertical tracks. With such construction, the strength of springs 66 would be such as to cause no undue frictioning between closures 63 and the door jambs, so as not to hinder easy operation of the door.

It will be seen that there has been provided a garage door, possessing improved features of construction which are admirably suited to fulfill their intended functions, whereby, among other advantages, a commercially practicable, light, strong, inexpensive, long-lived, metal door is made available.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. An overhead acting door comprising a plurality of flexibly articulated superposed panel frames, one of said frames having spaced rails and stiles extending between and connecting them, said rails being in the form of an open backed sheet metal tube having inturned flanges, the open back of said tube being located along an outer surface of the finished frame to afford access to the interior thereof during assembly.

2. An overhead acting door comprising a plurality of flexibly articulated superposed panel frames, one of said frames including interconnected sheet metal rails and stiles each being formed with a web, side walls extending from opposite edges of said web, and a strengthening flange extending angularly from at least one of said side walls, one side of said rails and stiles being open sufficiently to afford access to the interior thereof during interconnection.

3. A panel frame for overhead acting doors comprising spaced hollow sheet metal longitudinal members, hollow sheet metal transverse members extending between and each having a rigid joint with said longitudinal members, said joint including a tenon on one of said members passing through a slot in a closed face of the other member and having a bent locked position thereagainst, a reinforcing element located inside said slotted member against said tenon, and means for holding said reinforcing element in clamping relation against said tenon.

4. An overhead acting door comprising a plurality of superposed hingedly connected panel frames, each of said frames including top and bottom rails of open backed tubular construction, hinges connecting said panels, and reinforcing channels held inside said rails opposite said hinges and adapted to afford a fastening support therefor.

5. A sheet metal door construction comprising a plurality of superposed panel frames, each of said frames including top and bottom rails having web and side wall portions, hollow stiles extending between each of said top and bottom rails and having their ends abutting the web thereof, reinforcing members, one of said members being located within said rails opposite each abutting end of said stiles, and a tie-rod passing through each of said stiles and connecting the reinforcing members located opposite its ends, said rails having an open back located along an outer surface of the finished frame to afford access to the ends of said tie-rod during assembly of the frame.

6. A sheet metal door construction comprising a plurality of superposed panel frames, each frame including top and bottom rails having web and side wall portions, stiles or columns extending between said rails to take vertical compressive forces in said frame, vertically aligned pairs of reinforcing elements respectively located in said top and bottom rails, a tie-rod connecting each pair of said elements to take vertical tensile forces in said frame, and hinges respectively connecting a reinforcing element in the top rail of one frame to a reinforcing element in the bottom rail of the next superposed frame.

7. An overhead acting door comprising a plurality of flexibly articulated panel frames, one of said frames having frame elements each formed with a web, side walls extending from opposite edges of said web, mutually approaching spaced inturned strengthening flanges respectively located on said side walls, and a closure for said frame elements which comprises a sheet metal strip having grooves along its opposite edges which are adapted to fit over said strengthening flanges, said inturned flanges being spaced and located along the outer surface of the frame to afford access to the interior of a frame element during assembly of the panel frame.

8. In an overhead acting door construction, a plurality of superposed panel frames, the lower rail of one of said panel frames being formed of sheet metal and having a relatively narrow strengthening flange, and a weatherproofing strip running longitudinally along the lower outside edge of said rail and having a water shedding strip portion and a grooved attaching portion adapted to fit over said strengthening flange.

9. A sheet metal panel frame for overhead acting doors, including a metal panel sheet, and top and bottom rails located along edges of said sheet, one of said rails comprising a web perpendicular to said sheet, side walls extending from said web, and inturned strengthening flanges spaced and extending inwardly from said side walls, said rail being of composite form and having its parts joined substantially along a longitudinal axis of its web.

10. An overhead acting door which is adapted to be lowered into substantially erect position adjacent a door frame, comprising a plurality of flexibly connected superposed panel frames, and a plurality of independent, resiliently yieldable, weatherstrip units extending in vertical alignment along the sides of said door, one of said units being located at each side of each panel.

11. An overhead acting door which is adapted to be lowered into substantially erect position adjacent a door frame, comprising a plurality of flexibly connected panel frames, a plurality of independent, resiliently yieldable, weather-strip units extending in vertical alignment along the sides of said door, one of said units being located at each side of each panel, and a resiliently yieldable weather-strip unit extending from side to side across the top of said door.

12. An overhead acting door which is adapted to be guided into slightly inclined position adjacent a door frame, comprising a plurality of flexibly connected panels, and weather-stripping fastened vertically along said door at its sides and uniformly convergently tapered from top to bottom thereof, said weather-stripping comprising a plurality of independent, resiliently yieldable, wedge shaped sections located in vertical alignment one at each side of each panel.

13. In an overhead acting door comprising a plurality of superposed hingedly connected panel frames, a plurality of independently acting weather-stripping sections extending from top to bottom thereof at its opposite sides, said sections each comprising a pair of outwardly projecting guides having spaced restraining flanges, a closure member slidably projecting through the space between said restraining flanges, flanges on said closure member confined behind said restraining flanges to limit said projection, and spring means yieldably urging said closure member outwardly away from the panel frame.

14. In an overhead acting door comprising a plurality of superposed hingedly connected panel frames, a plurality of independently acting weather-stripping units extending from top to bottom thereof at its opposite sides, said units each comprising a sheet metal casing having an elongated opening, a vertically extending closure member outwardly slidable through said opening and having an interlocked loose motion connection with said guide means to limit said outward movement, and spring means within said casing yieldably urging said closure member outwardly away from the panel frame.

15. A method of fabricating sheet metal overhead acting doors which comprises interconnecting at right angles to each other a plurality of sheet metal open backed tubes to form a panel frame, and thereafter affixing a closure for the open backs of said tubes.

16. An overhead acting door comprising a plurality of superposed panel frames, one of said frames having framing members in the form of hollow sheet metal members, each having a closed web as one face, a sheet metal connecting member extending between and having a rigid joint with said web, said joint including a tenon on said connecting member passing through a slot in said web, and said tenon having a bent position adjacent the slotted member to lock the joint.

17. An overhead acting door comprising a plurality of superposed panel frames, one of said frames having framing members in the form of hollow sheet members provided with one face which is open to give access to the interior and with other faces which are substantially closed, two of said hollow members being joined at right angles by a tenon extending from the end of one such member and mating with a slot in a closed face of the second member.

18. An overhead acting door comprising a plurality of superposed panel frames, one of said frames having sheet metal framing members of hollow construction so disposed that the ends of one member engage closed faces of two other members, reinforcing plates inside the closed sides of said last named members opposite the end of said first member and a tie-rod passing through said first member and connecting the said reinforcing plates located opposite its ends.

19. An overhead acting door comprising a plurality of flexibly articulated panel frames, one of said frames having frame elements formed with a web, side walls extending from opposite edges of said web, mutually approaching spaced inturned strengthening flanges respectively located on said side walls, and closures for said frame elements which comprise sheet metal strips adapted to be held by said inturned flanges, said flanges being spaced and located along an outer surface of the frame to afford access to the interior of the frame element during assembly of the panel frame.

20. An overhead acting door comprising a plurality of flexibly articulated superposed panel frames; said frames each having slotted top and bottom rails in the form of open backed sheet metal tubes having inturned strengthening flanges, transverse sheet metal stiles extending between and having their opposite ends respectively abutting said rails, rigid joints at the abutting portions of said rails and stiles comprising tenons projecting from the ends of said stiles through slots in said rails and having a bent locked position in the interiors thereof; the open backs of said rails affording access to the interiors thereof during assembly and being located along the top and bottom edges of each panel frame whereby the open top of one frame opposes and underlies the open bottom of the next superposed frame in the assembled condition of the door.

21. An overhead acting door construction comprising a plurality of superposed panel frames, each frame including top and bottom rails of open backed tubular form, hollow stiles extending between said rails to take vertical compressive forces in said frame, reinforcing elements located in said rails opposite the ends of said stiles, a tie-rod passing through each of said stiles and connecting the reinforcing elements at the ends thereof to take vertical tensile forces in said frame, and hinges respectively connecting a reinforcing element in the top rail of one frame to a reinforcing element in the bottom rail of the next superposed frame.

22. An overhead acting door construction comprising a plurality of superposed panel frames, each frame including top and bottom rails having slotted web portions and side wall portions, hollow stiles extending between said rails to take vertical compressive forces in said frame, tenons projecting from the ends of said stiles through slots in said rails and having a bent locked position thereagainst, reinforcing elements located in said rails opposite the ends of said stiles; a tie-rod passing through each of said stiles and connecting the reinforcing elements at the ends thereof to take vertical tensile forces in said frame and to clamp such elements against said tenons, and hinges connecting the top rail of one frame to the bottom rail of the next superposed frame.

MILTON L. CORNELL.